United States Patent Office 3,552,162
Patented Jan. 5, 1971

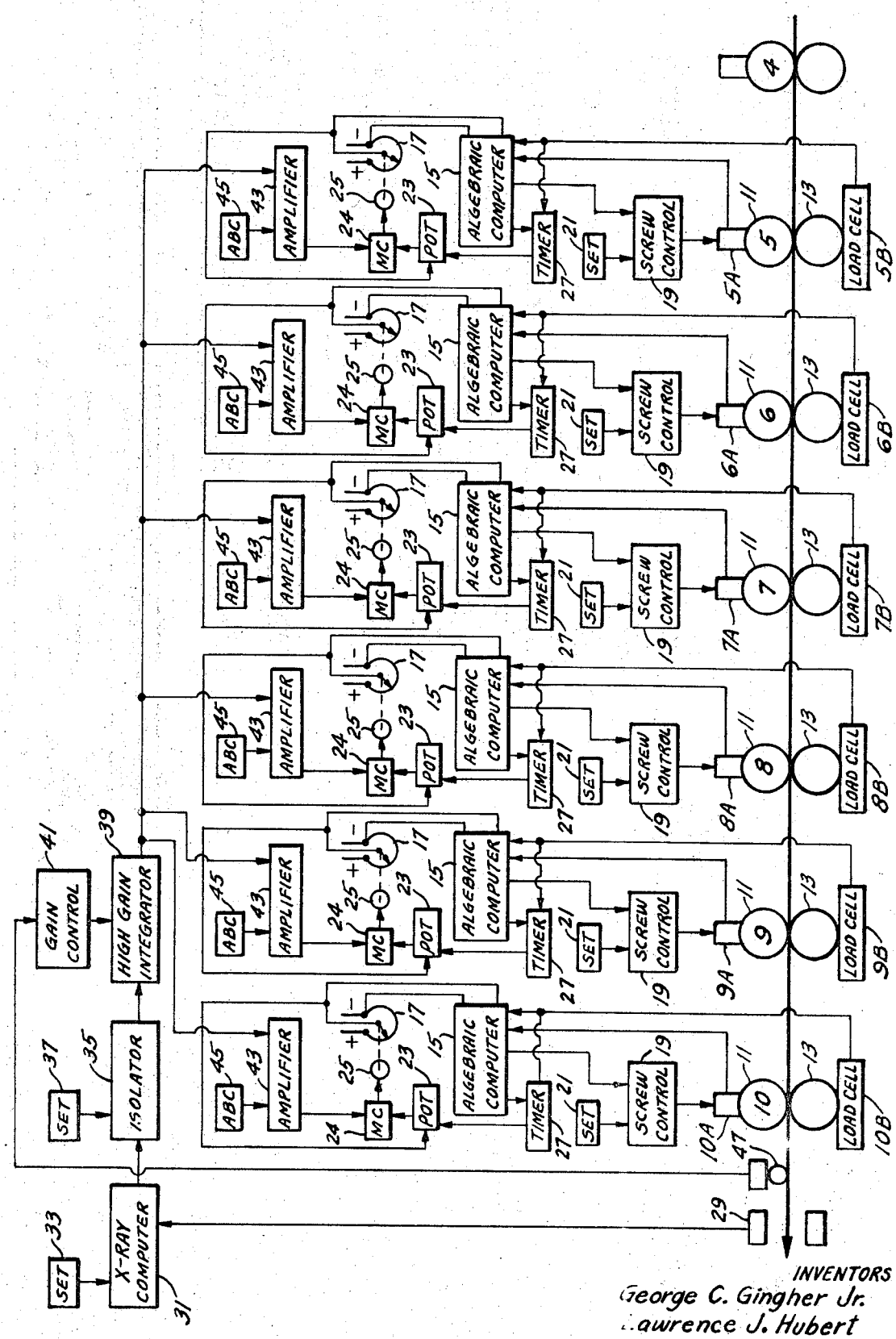

3,552,162
ROLLING MILL CONTROL SYSTEM
George C. Gingher, Jr., Sparrows Point, and Lawrence
J. Hubert, Baltimore, Md., assignors to Bethlehem
Steel Corporation, a corporation of Delaware
Filed Apr. 22, 1968, Ser. No. 723,176
Int. Cl. B21b 37/12
U.S. Cl. 72—8     13 Claims

ABSTRACT OF THE DISCLOSURE

A rolling mill has a gagemeter control on substantially every mill stand. An X-ray gage deviation signal is fed through an isolator unit which provides a wide dead-band within the gage tolerance for a particular order. If the gage deviation signal exceeds the width of the dead-band the deviation signal is integrated in a high gain integrator and used to change the set point of the gagemeters on each gagemeter controlled mill stand until the X-ray gage deviation returns within the dead-band provided by the isolator unit.

BACKGROUND OF THE INVENTION

This invention relates to automatic control systems for rolling mills wherein very fast corrections in gage can be made by automatic control.

In the past so-called "gagemeter" gage control systems such as basically disclosed in Pat. 2,680,978 to Hessenberg et al. have been used in combination with X-ray or similar radiation type gage monitors to automatically control the rolling of strip in rolling mills. In these mills the X-ray, due to space limitations and the generally delicate nature of X-ray apparatus, is usually placed subsequent to the rolling stands to determine the final gage of the strip. Also, with loopers used, the X-ray would not work accurately between stands. Due to the transport delay of the strip in reaching the X-ray monitor the actual gage of the strip passing through the mill stands at any given time cannot be directly determined and the X-ray gage deviation signal is customarily used only to correct long-term errors due to mill heating and strip cooling and to correct overall errors in the gage of the strip rolled, while the gagemeter controls on the individual mill stands correct for short-term changes as gagemeter stands can make corrections in gage with less time lag.

In order to minimize the transport time from the rolling stand to the X-ray gage it has been customary to apply the X-ray signal only to the last mill stand or last few mill stands. These stands may or may not be gagemeter controlled stands. As strip material is reduced in gage, however, the load signals which are used to calculate the spring of the mill become more and more similar to the screw position signals required to compensate for the spring until with very thin, and particularly with thin and wide material, the load cell signal changes by almost exactly the same amount with a change in screwdown as the screw position signal changes. Compensation for this factor must be provided in the gagemeter system else a point may be reached in which a change in load will produce no change in roll position due to the fact that there is no really unique combination of signals defining any given position of the screwdown. Sudden surges of feedback, such as occur when large corrections in gage are attempted may throw the gagemeter into an overcompensated region causing the screwdowns to run away. Because of this it is expedient not to attempt sudden large changes in gage through the X-ray even if the transport time is fairly small and it has thus been customary to change the X-ray signal only slowly even when only the last one or two stands are controlled. To this end a low gain integrator has been used to integrate the X-ray signal slowly and this low gain signal is combined with the gagemeter signal to determine the roll position. It is also undesirable to make drastic changes in gage with only one or two stands as this strains these particular mill stands and may detrimentally affect the shape of the strip. Normal integration speed has seldom been greater than would provide a gage change of 0.15 to 0.25 mil per second.

The slow integration of the X-ray signal has operated fairly effectively for long-term changes but does not provide a system which can bring an off gage strip quickly onto gage by automatic control. This has had to be accomplished by manual changes to the mill, which are inherently inaccurate and unreliable, or by quite complicated and expensive full computer systems.

Recently high gain integrating equipment has been used on isolated mills to quickly apply an X-ray signal to the last one or two stands of a mill, where the transport time is minimized. Such high gain integration signals from an X-ray have been coupled with a pulsed signal, the intervals between pulses allowing the effect of the signal to be determined before a further change is made. Pulsed signals have also been used with low gain integrated X-ray signals to allow for some of the transport time for earlier stands but low gain integrated signals have in general not been compensated for the gage change which might occur during the transport time to the X-ray monitor. The pulsing of the X-ray signal in effect merely slows down the reaction of the control system to a gage deviation signal and is in all essential respects equivalent to providing a lower gain integrated signal with the exception that if the pulses happen to line up correctly with both the onset of a gage deviation and the proper time for terminating operation of the screwdown mechanism to allow compensation for further gage change during the transport time, better stability of the system may be obtained due to decreased hunting. Accidental lining up of the pulses to provide the optimum cut off time cannot be depended upon, however, and the net result of a pulsing signal is usually merely to decrease the overall effect of any given screw deviation signal.

Prior control systems, therefore, have either relied upon a very slow integration of an X-ray signal, in which case quick corrections of off gage material could not be made; or upon fast integrations of the X-ray signal to the last mill stands, which expedient corrected gage quickly but overloaded the last stands with respect to preceding stands with detrimental effects, or upon expensive auxiliary computer systems such as digital computers which can recompute desired roll positions on every stand of a mill for every gage change.

The inability to make quick gage changes with a simple X-ray gage system has been particularly disadvantageous in merchant rolling mills where only two or three bars may be rolled before a gage change is made for a new order. If the initial setup of the mill does not provide correct gage strip one whole bar, or in other words as much as one third to one half of the order, may be rolled off gage before the roll positions can be adjusted to provide correct gage. Much of this material must be rerolled to obtain correct gage if it is overage or to make it suitable for another order if it is undergage.

SUMMARY OF THE INVENTION

We have discovered that the foregoing objections can be obviated and gage changes made quickly to a merchant mill having gagemeter control systems on each mill stand so as to greatly decrease off gage material rolled and the number of rerolls necessary by the provision of a high gain integration of an X-ray monitor signal in combination with a wide dead-band optimally twice the width in mills of the total change in gage in mills expected during the transport time of the mill using the high gain integration.

An isolator unit is used to provide a dead-band on either side of the desired gage of the strip and to cut off the X-ray deviation signal from the integrator as long as the gage of the strip is within the dead-band. When the gage deviation signal, however, exceeds the width of the dead-band, the deviation signal passes through the isolator unit to the high gain integrator where it is integrated and a large deviation signal is directed to a means to change the set point of the gagemeters on the gagemeter controlled rolling stands. The set points of the gagemeters are changed until the gage of the strip as indicated by the gage deviation signal from the X-ray monitor returns to the edge of the dead-band at which time the isolator unit cuts off any further deviation signal to the integrator and the integrator then holds the last setting on the set points of the gagemeter controls on each mill stand. Each gagemeter continues to operate at all times to correct for short-term changes in gage. A large deviation from gage, however, if it is large enough to exceed the dead-band will cause a very fast correction of gage spread over all the mill stands and controlled by the X-ray monitor. If the gage measured on the initial portions of the first bar of a new order shows that the gage is off by more than an allowable amount as set by an isolator or dead-band unit the rolls of all the mill stands will be rapidly adjusted up or down by the X-ray control signal to bring the gage of the strip rapidly onto correct gage within a fraction of the length of the initial bar. Off gage material and resulting rerolls are consequently greatly reduced.

BRIEF DESCRIPTION OF THE DRAWING

The single figure is a diagrammatic representation of a rolling mill having an automatic mill control system according to the present invention.

DESCRIPTION OF THE PREFERRED EMBODIMENT

In the figure are shown six stands 5, 6, 7, 8, 9 and 10 in a hot rolling mill finishing train. The rolls of previous roughing stands such as stand 4 are conventionally set in predetermined positions and not automatically controlled by the system described here. Each of the stands has upper rolls 11 and lower rolls 13. Each stand also has a screwdown mechanism 5A, 6A, 7A, 8A, 9A and 10A and a load cell 5B, 6B, 7B, 8B, 9B or 10B designed to detect the load or force existing between the rolls of the stand. Each of the controlled stands are gagemeter stands in which the load signals from the respective load cells 5B, 6B, 7B, 8B, 9B and 10B are applied to an individual algebraic computer 15 for each stand and summed according to the well known gagemeter formula with a screwdown position signal derived from the respective screwdown mechanism 5A, 6A, 7A, 8A, 9A or 10A by any suitable mechanism such as a selsyn, not shown, and compared with a reference signal derived from a suitable reference device such as potentiometers 17 for setting the desired roll opening. A deviation signal is then directed by the algebraic computer 15 to an automatic screw control 19, of each respective mill stand which control activates the screwdown mechanism of the particular mill stand to move the rolls until the three control signals have reached a null point.

At the beginning of operation of the mill, or between orders, screw controllers 19 are activated by set point means 21 which may be set manually or by computer means to position the rolls to a predetermined position.

Preferably as each strip or more usually the first strip of each order enters each mill stand the reference potenticmeter 17 for each respective mill stand will be balanced automatically to match the computed sum of the load cell signal and the screw position signal by means of a suitable potentiometer type balancing device 23 which receives the computed signal from algebraic computer 15 and the reference signal from the reference potentiometer circuit 17 and directs a motor operating signal through motor controller 24 to reset motor 25 which moves the reference potentiometer 17 to balance the two signals to a null point a predetermined time after the strip enters the mill stand determined by timer 27 from a load cell signal from the respective stand. Thereafter for the remainder of the strip or order the reference potentiometer 17 remains at the same set point so long as the gage of the strip as determined by an X-ray or other similar radiation type gage monitor 29 does not deviate more than a predetermined amount from the optimum or desired gage, and the computed roll opening signal is balanced against it in normal gagemeter manner by the operation of the respective screwdown mechanism by controller 19 to alter the screw position feedback signal. The control signals from the algebraic computer 15 to controller 19 may be pulsed if desired in order to stabilize the system and give time for the effect of each change to be determined by the system so that overshooting of the gagemeter will not occur.

X-ray gage apparatus 29 directs a gage signal to X-ray computer 31 where the signal is compared with the desired gage of the strip supplied by a signal from X-ray set point apparatus 33 to provide an X-ray gage deviation signal to isolator unit 35 where a dead-band of a desired width is set by appropriate set point means 37. If the voltage of the X-ray deviation signal exceeds the dead-band the signal is applied to high gain integrator 39 which is preferably adjustable through gain control 41 and of a construction such that it can provide an integrated signal to amplifiers 43 associated with each gagemeter controlled stand equivalent to at least .75 to 2.00 mils per second change in the gage of strip passing the radiation monitor or X-ray 31. Amplifiers 43 additionally amplify the integrated signal before it is applied to each motor control 24 of reset motors 25 of the set point potentiometers 17 of each mill to reset the gagemeter reference signal of that mill stand. As the reference set point of the gagemeter of each stand is reset the gagemeter control, which is designed to be a very fast acting control system since there is no transport time to be compensated for in a gagemeter system, closely follows the reference signal and changes the position of the rolls in the stand at a rate equal to at least .75 to 2.00 mils per second so that a very quick gage change is made by the X-ray signal. This gage change is applied to each gagemeter controlled stand so that the load is spread over all the stands and not concentrated in the last one or two stands where the transport time is least. Since it is desirable to maintain the screwdown movement of each stand in a set proportion with the screwdown movement of every other stand in order to maintain substantially the same proportional load in all stands, and since the screwdown of the initial stands of a mill must be proportionately greater in order to effect the same load in the initial mill stands—since the metal of the strip is softer in the initial mill stands than in later mill stands—the amplifiers 43 of the initial stands in the mill are adjusted to amplify the integrated gage control signals of the initial mill stands proportionately more than the signals to the later mill stands in order to attain a greater proportional screwdown movement for the same signal. Amplifier biasing controls 45 are provided for each amplifier 43 so that the additional gain may be varied for different mill setups and different gages of material being rolled to maintain a balanced mill load overall. If one or more of the stands on the mill, for instance, are dummied, as may be done particularly when heavy gage material is being rolled, the proportion of screwdown between the stands will have to be varied from the usual proportion in order to maintain a balanced load condition in the mill.

A tachometer 47 may be used if desired to provide a signal proportional to the speed of the mill and applied to the gain control 41 of the high gain integrator 39 to increase the gain of the integrator—that is to say to vary how great a change in signal is put out as a result of a changed input signal—depending upon the speed of the mill. The faster the speed of the mill the shorter will be the transport time and thus the greater the amount of strip which will leave the mill before any given gage correction is completed. As the transport time of the mill becomes less, therefore, the rate of screwdown of the mill stands can be increased and still provide the same total change in gage during the time any given length of strip is in the mill.

The speed of allowable integration is related to the width of the dead-band and the transport time. The allowable dead-band is limited by the allowable gage tolerance of the particular order. Since strip cannot be rolled to absolute gage there is always a certain allowable deviation from gage which will be acceptable to the customer. The extreme width of the dead-band is restricted to this gage tolerance as the gage of the strip cannot be allowed to become greater without becoming unacceptable to the customer. Preferably the width of the dead-band is set somewhat inside the gage tolerance. When the width of the dead-band is set by the allowable gage tolerance the gain of the integrator is set so that the expected change in gage of the strip during any given transport time of the mill is one half the width of the dead-band. As an example, if an order has a gage tolerance of plus or minus one mil—an extremely narrow gage tolerance—the width of the dead-band could be set at plus or minus ¾ of a mil. The speed of integration of the mill may then be set so that the expected change in gage of the strip after a maximum screwdown change of the mill over the transport time will approximate ¾ of a mil. With such a mill setup so long as the gage of the strip is within the dead-band the gagemeter control on each stand controls the position of the rolls to make quick independent corrections to produce uniform strip. If the gage of the strip exceeds the gage tolerance set in the width of the dead-band, the deviation signal from X-ray computer 31 will be passed through isolator 35 to integrator 39 where it will be integrated and a signal put out to change the reference 17 of each gagemeter. This signal will continue to change until the gage of the strip passing through the X-ray monitor returns to the edge of the dead-band or within plus or minus ¾ mil of the desired optimum gage of the strip. At this point the gage deviation signal is cut off by the isolator unit 35 and the integration stopped. Integrator 39 then holds the previous signal so that the set points of the gagemeters are held at the new reference point which they have attained and the gagemeters continue to correct minor variations in the gage of the strip as they occur based upon the new gagemeter reference signal.

When the X-ray gage deviation signal is cut off from the high gain integrator 39 the gage of the strip passing through the X-ray has reached a gage ¾ mil from the desired optimum gage, and all further movement of the rolls in response to the X-ray deviation signal is terminated. Since there is a lag in the detection of the change in gage at the rolls, however, due to transport time, as the strip which was passing through the mill stands at the time the movement of the stands due to the X-ray signal was terminated reaches the X-ray gage the measured actual gage of the strip leaving the mill will continue to change until all the strip which was in the mill when the movement of the rolls was terminated has left the mill and passed through the X-ray gage. If the width of the dead-band, the gain of the integrator and the speed of the mill are correctly related this further change in gage should equal ¾ mil. This will bring the gage of the strip leaving the mill exactly to the optimum desired gage at the end of the transport period.

As a practical matter because the last stands of the mill have more effect on the final gage of the strip even in a balanced mill than the initial stands, although the initial stands decrease the load on the subsequent stands and improve the quality of the product, the length of strip upon which actual transport time is based will not be the actual length of the mill from the initial rolls to the X-ray gage but some length of strip in-between and thus the practical transport time will be less than the theoretical transport time calculated from the length and speed of the mill. Calculation of the amount of change during the transport time may be made on either basis, however, as the important figure is the actual total change in gage experienced at the exit end of the mill after any given rate of change of the set point of the gagemeters. As a practical matter a fairly broad dead-band and a corresponding speed of integration will usually be selected in conformance with the usual speed of the mill and the minimum gage tolerance on orders run in that mill. We have found that an integration rate sufficient to cause at least 0.75 mil to 2.00 mils per second change in the gage of strip passing the radiation monitor and a dead-band of at least plus or minus 0.5 mil to plus or minus 0.75 mil of gage of strip passing the radiation monitor is necessary for effective operation of our invention on a modern high speed mill. It will be recognized that the wider the dead-band the more gain can be had in the integrator for a given mill speed and thus the more quickly can off-gage strip be brought back to an acceptable gage.

It is not necessary that all the stands of the mill be gagemeter controlled or that all the stands be controlled by the high gain wide dead-band radiation monitor gage deviation signal of the present invention. Furthermore the high gain wide dead-band radiation monitor control system may be useful on mill stands not including a gagemeter. In order to attain the greatest benefits from the invention, however, it is necessary that the majority of the controlled stands of the mill shall be controlled by a combination of a gagemeter system and the high gain wide dead-band signal of the present invention in order to attain a balanced mill setup with quick correction of off-gage strip by the X-ray control. The system of the invention not only is effective in minimizing rerolls but is extremely economical to install and maintain and requires little additional apparatus over that used in conventional X-ray and gagemeter controlled mills. In at least one installation the invention has effectively cut rerolls from more than 300 tons per week average to considerably less than 50 tons per week average.

While the invention is illustrated with the X-ray monitor signal used to change the set point of the individual gagemeters this constitutes only a preferred manner of adding the integrated, biasing X-ray signal to the gagemeter signal and any other suitable method of adding the two signals together may be used.

We claim:

1. A gage control system for a rolling mill having a plurality of rolling stands including automatically controlled stands and at least one stand automatically controlled in at least substantial part by a radiation monitor control comprising:
    (a) a radiation monitor means subsequent to the radiation monitor controlled stands of said rolling mill to provide a gage deviation signal proportional to the deviation from a predetermined desired gage of the strip passing said radiation monitor means,
    (b) a high gain integration means to integrate said gage deviation signal,
    (c) control means to receive the integrated signal and to control the movement of the screwdown mechanism associated with the radiation monitor controlled stands in accordance with said integrated signal to cause the opening between the rolls of said radiation monitor controlled stands to approach the opening necessary to provide finished strip having said predetermined desired gage, and (d) isolator means to prevent said gage deviation signal from affecting said high gain integration means over a dead-band range substantially equal to twice the total gage change contribution from all said radiation monitor controlled rolling stands during one transport period of said rolling mill.

2. A control system for a rollng mill according to claim 1 additionally comprising:

(e) independent gagemeter control means to control the position of the rolls of at least several of said radiation monitor controlled stands in accordance with load cell and roll position signals from detector means associated with each of said several controlled stands, and (f) means to sum said high gain integrated radiation monitor gage deviation signal with the gagemeter control signals of the roll stands controlled by both said signals.

3. A control system for a rolling mill according to claim 2 wherein said high gain integrated radiation monitor gage deviation signal is added to said gagemeter control signal by control of a gage set point means for said gagemeter control.

4. A control system for a rolling mill according to claim 3 wherein at least a majority of the stands of the rolling mill are controlled by the combined gagemeter and high gain integrated radiation monitor signals.

5. A control system for a rolling mill according to claim 4 wherein the gain of said integration means is sufficient to alter the set point of said gagemeter control on each controlled stand at a rate equal to at least .75 mil to 2.00 mils per second change in the gage of strip passing the radiation monitor.

6. A control system for a rolling mill according to claim 5 wherein the isolator means provides a dead-band in the radiation monitor gage deviation signal passing to the integration means equivalent to at least plus or minus ½ mil to plus or minus ¾ mil of the desired gage of strip passing said radiation monitor means.

7. A gage control system for a rolling mill having a plurality of rolling stands and including the following elements associated with each of at least a majority of said rolling stands:

(a) load cell means to provide a first signal proportional to the separating force between the rolls of said stands, (b) means to provide a second signal nominally proportional to the separation between the rolls of said stands, (c) reference signal means to indicate a predetermined desired separation between the rolls of said stands by a third signal, (d) means to combine said first, second and third signals to provide a fourth signal proportional to the error between the desired roll position and said actual roll position; and (e) control means responsive to said fourth signal to operate the screwdown mechanism of said rolling stands, the improvement comprising:

(i) radiation monitor means located subsequent to said controlled stands to provide a fifth signal proportional to the gage of strip passing said radiation monitor means, (ii) means to algebraically modify said fourth signal by said fifth signal, (iii) high gain integration means to integrate said fifth signal from said radiation monitor means, and (iv) isolator means operationally interposed between said radiation monitoring means of (i) and said modifying means of (ii) to provide a dead-band range in the circuit of said fifth signal substantially equal to twice the total gage change contribution of all of the controlled rolling stands during one transport period of strip through the mill.

8. A control system according to claim 7 wherein said fourth signal is modified by algebraically modifying said third reference signal by said fifth signal.

9. A control system according to claim 8 wherein said high gain integration means integrates at a gain sufficient to alter said fourth signal at a rate equal to at least .75 mil to 2.00 mils per second change in the gage of strip passing the radiation monitor.

10. A control system according to claim 9 wherein said isolator means provides a dead-band in said fifth signal equivalent to at least plus or minus ½ mil to plus or minus ¾ mil of the desired gage of strip passing said radiation monitor means.

11. A control system according to claim 9 wherein means are provided to detect the speed of strip through the mill and to increase the integration gain of said integration means as the speed of the strip increases.

12. A gage control system for a rolling mill according to claim 1 wherein there is more than one radiation monitor controlled stand and additionally comprising:

(e) means to predetermine the ratio of contribution of each radiation controlled gage change at each radiation controlled stand with respect to the total such gage change over a single transport period of said mill.

13. A gage control system according to claim 7 additionally comprising:

(v) means to predetermine the ratio of contribution of each radiation controlled gage change at each controlled stand with respect to the total such gage change over a single transport period of said mill.

References Cited

UNITED STATES PATENTS

| | | | |
|---|---|---|---|
| 3,049,036 | 8/1962 | Wallace et al. | 72—9 |
| 3,084,314 | 4/1963 | Ziffer | 72—16X |
| 3,089,365 | 5/1963 | Wallace et al. | 72—16X |
| 3,332,264 | 7/1967 | Bonn | 72—16 |
| 3,355,918 | 12/1967 | Wallace | 72—16 |
| 3,342,047 | 9/1967 | Briggs | 72—8 |
| 3,416,339 | 12/1968 | List | 72—8 |

MILTON S. MEHR, Primary Examiner

U.S. Cl. X.R.

72—16